(12) United States Patent
Siegfriedsen

(10) Patent No.: US 7,179,056 B2
(45) Date of Patent: Feb. 20, 2007

(54) WIND ENERGY INSTALLATION COMPRISING A CONCENTRIC GEARBOX GENERATOR ARRANGEMENT

(75) Inventor: Sönke Siegfriedsen, Drage (DE)

(73) Assignee: Aerodyn Engineering GmbH, Rendsburg (DE)

( * ) Notice: Subject to any disclaimer, the term of this patent is extended or adjusted under 35 U.S.C. 154(b) by 46 days.

(21) Appl. No.: 10/527,379

(22) PCT Filed: Aug. 13, 2003

(86) PCT No.: PCT/DE03/02722

§ 371 (c)(1),
(2), (4) Date: Jul. 1, 2005

(87) PCT Pub. No.: WO2004/027260

PCT Pub. Date: Apr. 1, 2004

(65) Prior Publication Data
US 2006/0104815 A1 May 18, 2006

(30) Foreign Application Priority Data
Sep. 13, 2002 (DE) .................. 102 42 707

(51) Int. Cl.
*F03D 9/00* (2006.01)
(52) U.S. Cl. ............... 416/170 R; 415/4.1; 29/55
(58) Field of Classification Search ........... 415/4.1, 415/4.3; 416/170 R; 290/54, 55
See application file for complete search history.

(56) References Cited

U.S. PATENT DOCUMENTS

| 2,450,290 A | 9/1948 | Maxwell |
| 4,427,897 A | 1/1984 | Migliori |
| 6,483,199 B2* | 11/2002 | Umemoto et al. ............ 290/55 |
| 6,911,741 B2* | 6/2005 | Pettersen et al. ............. 290/44 |

FOREIGN PATENT DOCUMENTS

| DE | 10043593 A1 | 3/2002 |
| EP | 0811764 A1 | 12/1997 |
| EP | 1101936 A2 | 5/2001 |
| WO | WO 02/14690 A1 | 2/2002 |

OTHER PUBLICATIONS

Grazianski, Thomas, "Tagundsband—Conference Proceedings," Technische Entwicklungen, Dewek (Germany), p. 17-20, (Dec. 1, 2000).
Enercon GMBH, "Enercon," Enercon Brochure, Technische Anderungen Vorbehalton (Germany), (Apr. 1, 1998).

* cited by examiner

*Primary Examiner*—Edward K. Look
*Assistant Examiner*—Dwayne J White
(74) *Attorney, Agent, or Firm*—Larson & Larson; Herbert W. Larson

(57) ABSTRACT

A wind energy plant comprising a rotor, a rotor shaft, a gear, and a generator, the generator embodied as a ring concentrically embracing the gear.

8 Claims, 2 Drawing Sheets

WIND ENERGY INSTALLATION COMPRISING A CONCENTRIC GEARBOX GENERATOR ARRANGEMENT

PRIOR APPLICATIONS

This §371 National Phase patent application bases priority on International Application No. PCT/DE2003/002722, filed on Aug. 13, 2003, which in turn bases priority on German Application No. DE 102 42 707.0, filed on Sep. 13, 2002.

BACKGROUND OF THE INVENTION

1. Field of the Invention

The invention relates to a wind energy installation with a concentric gear and generator arrangement according to the preamble of the main claim.

2. Description of the Prior Art

Numerous different drive train arrangements are known for wind energy plants. In addition to gearless plants, most plants are built up from a combination of a gear and a generator. In wind energy plants, the gear and generator are conventionally arranged successively as individual components on a machine support. In the case of damage, this allows a simple replacement of these components, but the overall structure thereof is long and consequently heavy and cost intensive.

In EP 811 764 B1, the gear and generator are incorporated in directly succeeding manner in a common housing, the gear being a single-step planetary gear and the casing is placed directly on the tower. The gear and generator have roughly the same external diameter, and both components are arranged in directly succeeding manner which leads to a compact, lightweight construction. However, the disadvantage arises that it is no longer possible to replace the individual components on the tower head.

In the case of damage to these components, the complete installation must be lifted down from the tower head. In addition, the installation in a common housing requires an approximate identical external diameter of both components, which once again does not lead to an optimum generator design.

WO 01/94779 A1 discloses an arrangement having a directly operated generator on the side opposite to the rotor. As a result of the large generator, this concept is extremely unfavorable from the economic standpoint because it is noncompetitive from the weight and cost standpoints.

DK 173 530 B1 discloses a very elongated drive train structure in which the gear and generator are successively arranged with an intermediate shaft. Although this structure allows the replacement of components, it is very heavy and cost intensive in its implementation.

The problem of the invention is to provide a wind energy installation allowing a simple replacement of gear and generator, and which has a compact lightweight construction. Advantageous embodiments are given in the subclaims.

SUMMARY OF THE INVENTION

According to the invention, the problem is solved in that the generator is constructed as a ring generator concentrically embracing the gear. The gear and generator arrangement is preferably located on the tower side opposite to the rotor.

The machine support must have on its one front face a front rotor bearing, and on its opposite front face a rear rotor bearing so that no rotor loads are transferred into the gear and generator arrangement.

However, the front rotor bearing can also be constructed as a torque bearing located directly on the hub, and which is fixed to the front face of the machine support. By means of an articulated intermediate shaft, once again, no external loads are transferred to the gear and generator arrangement.

The gear and generator are preferably connected in individually detachable manner to the machine support so that they can, in each case, be individually axially dismantled and replaced.

The gear can be a single-step planetary gear, but also a multi-step planetary gear. The gear ratio can be between 1:6 and 1:11 so that a generator rotatable at medium speed is necessary. For a rotor speed of e.g. 15 $\text{min}^{-1}$, the generator speed is consequently 90 to 165 $\text{min}^{-1}$.

The gear/generator arrangement is preferably provided with cooling fins by means of which the heat loss of the units can be dissipated to the external atmosphere. It is also possible to provide a lifting apparatus on the machine support for setting down the gear and generator arrangement.

For the costs and weight of a medium speed-rotatable generator, particularly in the case of construction as a magnetoelectric generator, it is advantageous that it is given a short construction in the form of a ring generator with a large diameter and short lamination stack length. Thus, for the generator there is a free internal diameter adequate in order to internally install a gear. If the gear is a single-step planetary gear or a multi-step planetary gear, the technical and economical optimum dimensions are such that the gear external diameter has a similar value to the generator internal diameter. Thus, the gear and the optimally designed ring generator can be positioned concentrically to one another. This arrangement ensures that only slowly rotating parts are present in the installation, which naturally has a limited wear and low failure probability.

As a result of the mounting in the machine support, the rotor loads are transmitted directly into the tower without loading the gear and generator. The concentrically positioned gear and generator are located on the side opposite to the rotor with respect to the tower axis. Thus, this unit creates a counterbalance weight for the rotor with respect to the vertical mounting. It is possible in this way to axially dismantle and replace the gear and generator.

The axial dismantlability, in conjunction with the very compact and consequently light-weight drive train arrangement, constitutes a decisive advantage, particularly in the case of large plants. It is possible to separately replace the individual components without having to dismantle the rotor. The gear, and also the generator rotor and stator, can be individually disassembled and replaced after removing the cover.

The arrangement of the generator stator as an outermost component makes it possible to dissipate most of the generator heat loss to the external atmosphere via a fin system. The interior of the common housing and gear can dissipate their heat loss to the outside via the further optionally finned housing parts. The driving gear of the generator rotor can be equipped with fan elements in order to ensure the necessary air circulation within the housing. As a result, a gear and generator unit completely sealed against environmental influences can be created which is able to dissipate the heat loss via external walls.

BRIEF DESCRIPTION OF THE DRAWINGS

Further advantages and features of the present invention can be gathered from the following description of the preferred embodiment relative to the attached drawings, wherein.

DETAILED DESCRIPTION OF THE PREFERRED EMBODIMENT

Figure 1:
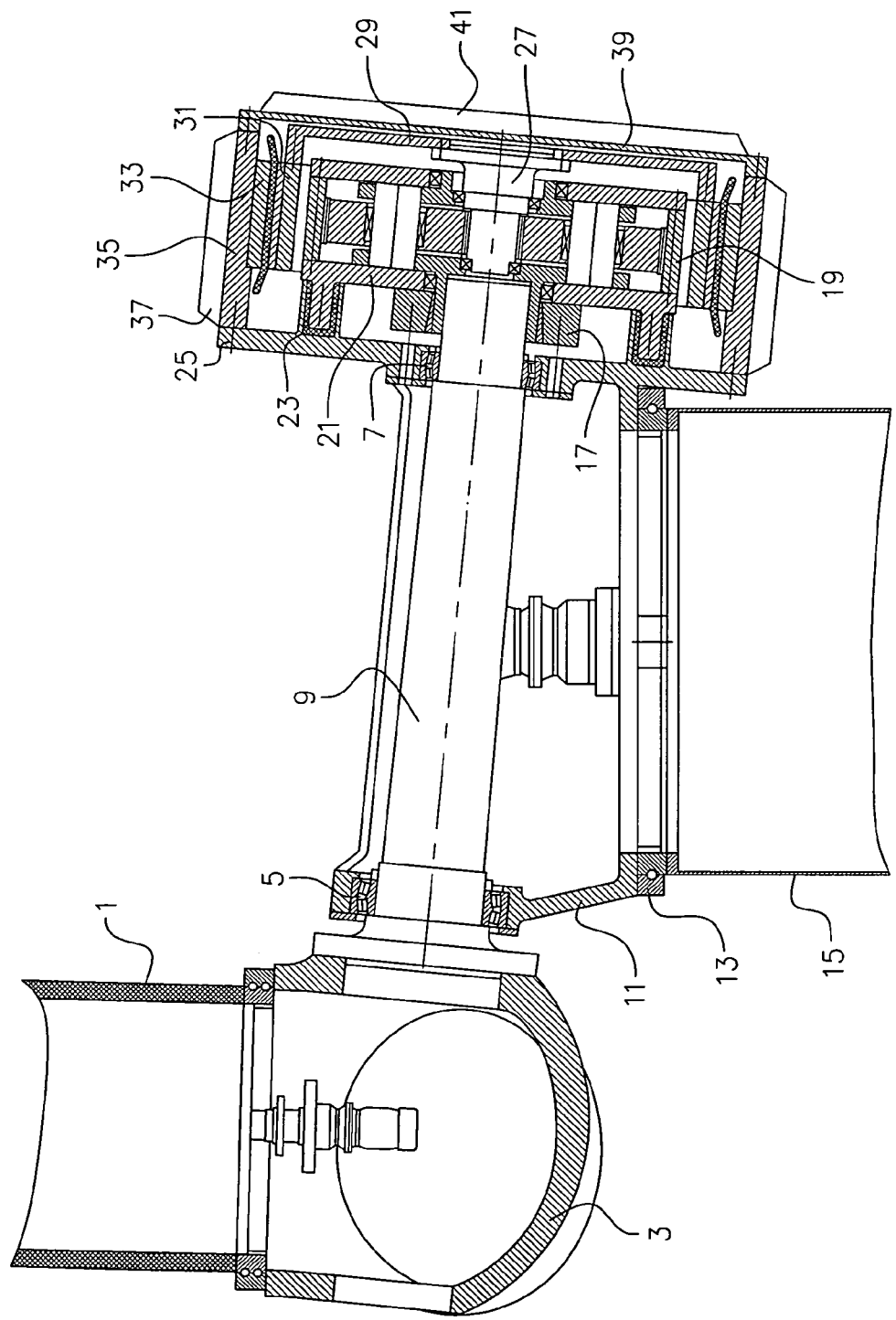
FIG. 1 shows a perspective sectional view of a preferred embodiment of the wind energy installation comprising a concentric gear and generator arrangement.

The wind energy installation rotor blades 1, only partly shown in FIG. 1, drive a hub 3 which also receives all the further force and momentum produced by the rotor. By means of a front rotor bearing 5 and a rear rotor bearing 7, a rotor shaft 9 is mounted and the rotor loads are transmitted to a machine support 11.

A vertical bearing 13 then transfers the loads into the wind energy plant tower 15. As a result, the external aerodynamic loads and mass loads of the rotor are introduced into the tower without having to be entirely or partly passed via the gear or generator. By means of a connecting element 17, e.g. a shrink ring, the gear 19 is connected in torque-resistant manner to the rotor shaft 9.

A gear casing 21 is supported by means of the elastic elements 23 with respect to a base plate 25. These elastic elements 23 ensure that torque surges are absorbed and structural deformations, as a result of external loads, do not lead to a loading of the tooth system or mounting support 11 in the gear 19.

By means of the driven shaft 27 of the gear 19, the connecting gear 29 is driven and is once again connected to the generator rotor 31. Said rotor 31 is concentric to the gear 19 and embraces the latter, having a diameter larger than the gear casing 21. The connecting gear 29 is detachably connected to the generator rotor 31 in order to be able to disassemble the gear 19 without dismantling the generator rotor 31.

The generator stator 33 is fixed by means of the casing 35 to the base plate 25 on the machine support 11. As a result of the fin system 37 of the casing 35 to the exterior, it is possible to ensure that the heat loss of the stator winding is dissipated to the external atmosphere. The cover 39 seals the entire drive train, and can consequently, through an external fin system 41, contribute to the dissipation to the atmosphere of the drive train heat loss.

Figure 2:
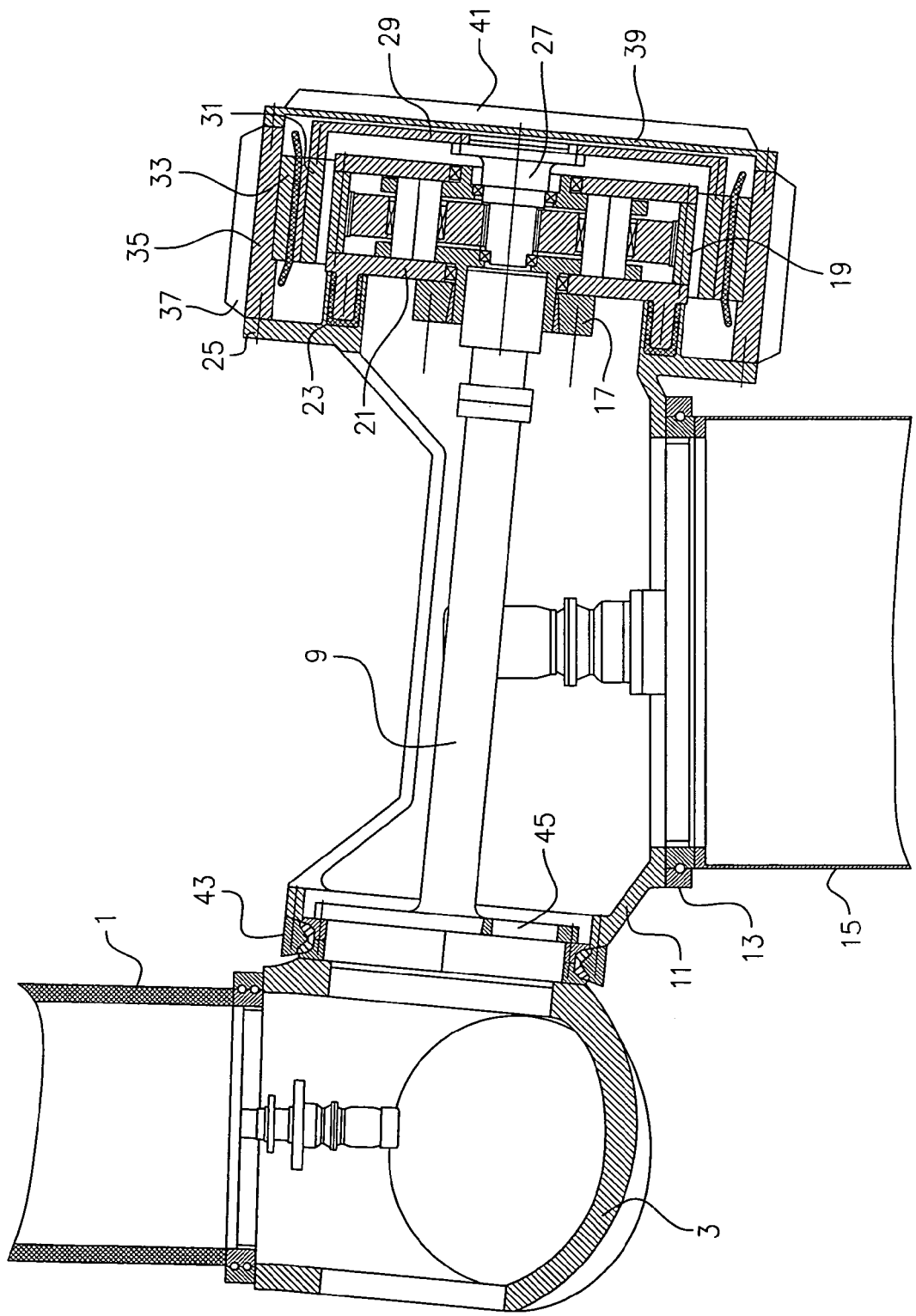
FIG. 2 shows a perspective sectional view of a second alternate embodiment of the present invention.

FIG. 2 shows a variation of the invention, wherein the rotor loads are transferred via the torque bearing 43 to the machine support 11. A torque bearing 43 absorbs all the external loads and only transmits the torque via shaft 9 to gear 19. As a result, the shaft 9 can be given a very lightweight construction. This construction also enables maintenance personnel to climb from the machine support 11 through a manhole 45 in shaft 9 into the hub 3. Otherwise, the gear and generator arrangement is identical to the construction of FIG. 1.

The invention claimed is:

1. A wind energy plant with a rotor, a rotor shaft, a gear, and a generator, the wind energy plant further comprising:
    the gear and the generator located together on a tower side opposite to the rotor;
    the generator constructed as a ring concentrically embracing the gear; and
    the gear and generator axially dismantlable and connected in an individually detachable manner to a machine support.

2. The wind energy plant according to claim 1, wherein the machine support has on a front face a front rotor bearing, and on an opposite front face a rear rotor bearing.

3. The wind energy plant according to claim 2, wherein the front rotor bearing is constructed as a torque bearing mounted directly on a hub.

4. The wind energy plant according to claim 1, wherein the gear is connected to the machine support by means of elastic elements.

5. The wind energy plant according to claim 1, wherein the gear is a single-step planetary gear.

6. The wind energy plant according to claim 1, wherein the gear is a multi-step planetary gear.

7. The wind energy plant according to claim 1, wherein the generator is a magnetoelectric ring generator.

8. The wind energy plant according to claim 1, wherein the gear and generator located together are cooled by cooling fins.

* * * * *